(No Model.)

J. F. THEURER & P. FISCHER.
PROCESS OF AND APPARATUS FOR FINISHING BEER.

No. 580,536. Patented Apr. 13, 1897.

UNITED STATES PATENT OFFICE.

JACOB F. THEURER AND PAUL FISCHER, OF MILWAUKEE, WISCONSIN, ASSIGNORS TO THE PABST BREWING COMPANY, OF SAME PLACE.

PROCESS OF AND APPARATUS FOR FINISHING BEER.

SPECIFICATION forming part of Letters Patent No. 580,536, dated April 13, 1897.

Application filed July 13, 1895. Serial No. 555,845. (No model.)

*To all whom it may concern:*

Be it known that we, JACOB F. THEURER and PAUL FISCHER, of Milwaukee, in the county of Milwaukee and State of Wisconsin, have invented certain new and useful Improvements in Processes of and Apparatus for Finishing Beer and other Beverages; and we do hereby declare that the following is a full, clear, and exact description of the invention, which will enable others skilled in the art to which it pertains to make and use the same, reference being had to the accompanying drawing, and to the letters of reference marked thereon, which forms a part of this specification.

The main object of our invention is to finish beer and other beverages in such a way as to give them the desired freshness, vivacity, and keeping qualities, and in the attainment of that object to economize space and time and to produce a superior article.

It consists in a novel process and in certain novel features in the construction and arrangement of apparatus for carrying out that process, as hereinafter particularly described, and pointed out in the claims.

In breweries where the old method of finishing beer by the so-called "kraeusening" process is employed a sufficient quantity of beer must always be kept on hand in bunging-casks ready to be drawn into shipping-kegs to supply the demand for finished beer. On the other hand, in breweries operated on a more modern and rational plan and employing the direct method of carbonating beer on its way from the storage-vat to the racking-bench with carbonic-acid gas either produced by the main fermentation of the beer or otherwise obtained the bunging-casks are entirely dispensed with. Consequently no finished beer is kept on hand in such breweries, since it is carbonated just before it is drawn into the shipping-kegs or bottles for delivery to consumers. For this method of carbonation it is essential that the supply of beer as well as of gas be free from air. To insure a constant supply of such storage-beer and carbonic-acid gas for the purpose of carbonating and finishing the beer as it is required for shipment or delivery, it is therefore necessary that no interruption occur, even though some essential part of the apparatus, such as the central tank, beer-pump, gas-pump, gas-holder, safety-valve, purifier, or other part of the system get out of order, or for any reason its operation has to be suspended. It is, for instance, indispensable that the fermenting-tubs and storage-vats be supplied inside with a new coating of varnish at least once a year. For this purpose the old coating must be removed and the tubs and vats thoroughly dried, requiring ordinarily some weeks, during which they cannot be used for storage or fermentation. Occasionally the central tank, gas-holder, &c., must be emptied and recharged and the gas-pipes and connections steamed or otherwise cleansed. In this way air is unavoidably admitted to the pipes and various parts of the apparatus. Consequently provision must be made for getting rid of the air thus admitted to different parts of the system without allowing it to enter other parts containing air-free gas and without interrupting either the ordinary brewing processes or the carbonation of the beer. Furthermore, carbonic-acid gas can be advantageously collected from those fermenting-tubs only in which vivacious or active fermentation is taking place. In large breweries the fermenting-rooms are usually located on several different floors, frequently in separate buildings, and the gas as well as the beer has sometimes to be collected simultaneously from several different sources, possibly located in different buildings and widely separated from each. To facilitate the collection of air-free beer and air-free gas from all these sources and to avoid any interruption of the operation of the plant, the component parts of the beer and gas collecting systems must be properly arranged and connected. This may be accomplished by providing two or more separate systems for collecting beer and gas in which every essential part of each system is interchangeable with the corresponding part of the other system, whereby as exigencies may arise, such as the breaking down of machinery, the necessity of frequently cleansing various parts of the apparatus, occasionally drying and varnishing the fermenting-tubs and storage-vats, &c., one or more parts of either system may be connected with other parts of another system in such a way that at least one complete system is always in condition for use. For this purpose every essential element or part of either system—fermenting-tubs, storage-vats, central tank, beer-pump, gas-holder, safety-valve, gas-pump, purifier, reservoir, carbonator, filter, and racking-bench—must be readily interchangeable with the corresponding part or element in the other system or systems without admitting air into succeeding parts of the apparatus or interfering with the continuous operation of the plant. Generally but one system, whatever its constituent parts may be, is designed to be in operation at any given time, but if necessary or desirable a number of systems can be operated simultaneously.

Figure 1:
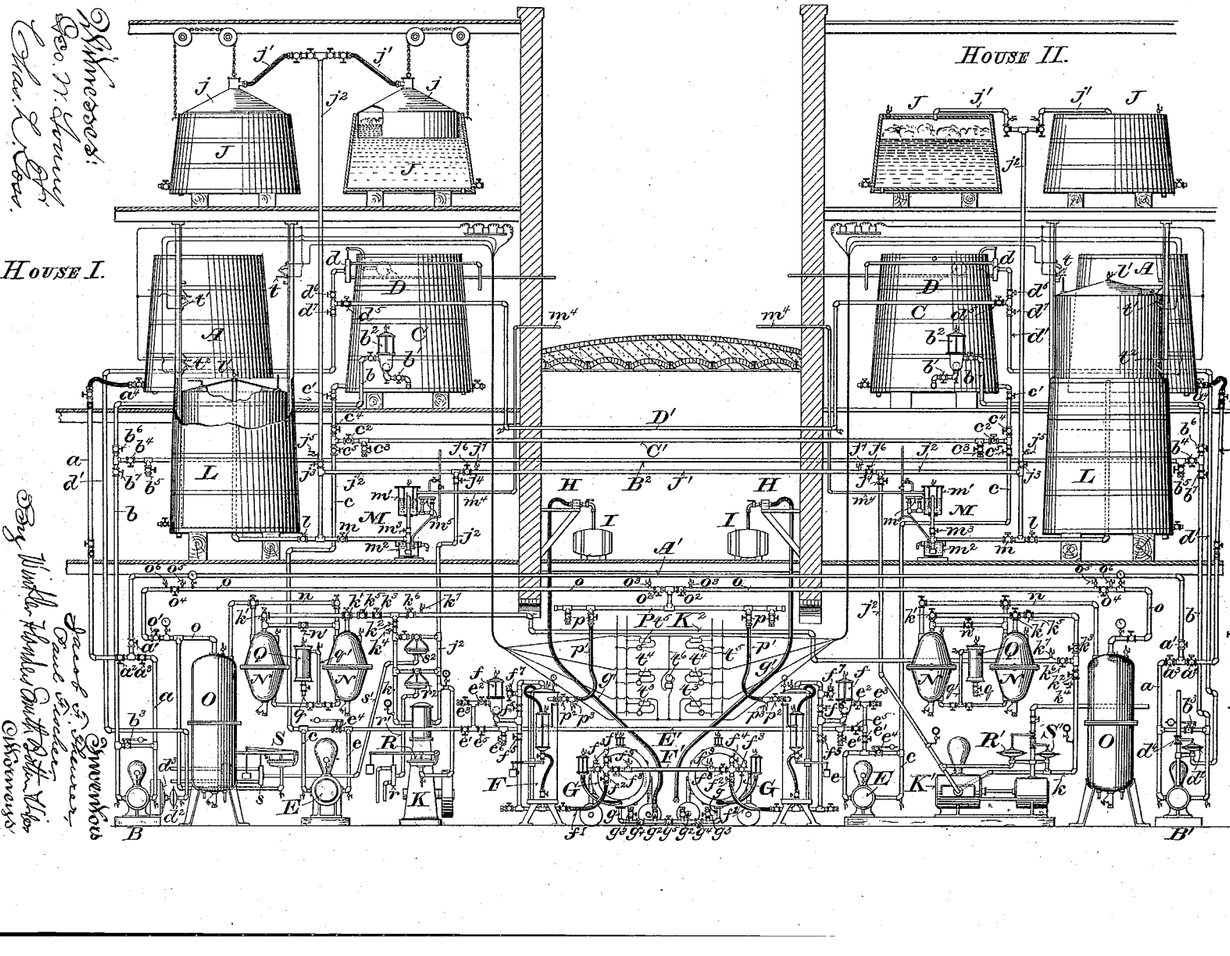
The accompanying drawing is a diagrammatic illustration of apparatus embodying our invention.

For the purpose of illustration we have shown two separate systems, the constituent parts of which are mainly located in separate buildings, cross connections being provided for substituting any element of either system for the corresponding element of the other system.

Referring to the accompanying drawing, which shows, partly in elevation and partly in section, apparatus embodying our improvements for carrying out our process, we will first describe the beer-supply and its connections of each system, the two systems being substantially alike.

A designates a storage-vat (a number of such vats being usually employed) into which beer is drawn from the fermenting-tubs. It is connected at or near the bottom by a pipe $a$ and hose or branch connection having a valve $a^4$ with the suction side of a pump B, which may be designated for convenience of explantion the "main beer-pump." The delivery-pipe $b$ of this pump leads into the bottom or lower part of an open vessel C, which may be designated the "central tank," and has next to it a valve $b'$ and a glass lantern $b^2$, provided on top with a vent or waste-valve and inside with a float-ball adapted to close its outlet in the bottom when it contains no liquid. The suction and delivery pipes $a$ and $b$ of pump B are connected by a by-pass provided with an automatic pressure-regulating valve $b^3$.

The central tank is provided with a float D, which is connected with and arranged to operate a stop and waste or three-way valve $d$ and admit or release fluid-pressure through a pipe $d'$ to a diaphragm or expansion-chamber $d^2$ for controlling the operation of pump B according to the level of liquid in the central tank. The diaphragm or movable part of the expansion-chamber may be connected for this purpose either with a friction-clutch $d^3$ in the case of a belt-geared pump, as shown in house I, or with a valve $d^4$ in the steam-pipe of a steam-geared pump, as shown in house II.

It is obvious that when the storage-vats A are located sufficiently above the central tank C the main beer-pump B may be dispensed with. In this case the float D, the expansion-chamber $d^2$, and their connections are arranged to operate a regulating-valve in the pipe leading from the storage-vats into the central tank and to control the flow of beer into the central tank according to the level of the beer therein. The central tank is made of sufficient capacity to supply a continuous flow of air-free beer to the carbonator during the interval required for disconnecting an empty storage-vat and connecting one filled with beer.

A pipe $c$, provided with a valve $c'$ near the central tank and leading out of the bottom or lower part thereof, connects it with the suction side of a pump E, which may be designated the "central-tank pump," which is in turn connected by its delivery-pipe $e$ with a carbonator F through a lantern $f$, like or similar to the lantern $b^2$. The pipe $e$ is provided with the stop-valves $e'$ and $e^2$ and an intermediate waste or vent valve $e^3$. When the central tank is located sufficiently above the carbonator to deliver the beer at the required pressure, say twenty pounds, to the carbonator, the pump E may be dispensed with; but in that case the delivery-pipe must be provided with a reduction-valve to insure constant pressure. When, however, the conditions are such that pumps are necessary, the pump E must be of sufficient capacity to deliver the beer at the required pressure to the carbonator, and the pump B must be of greater capacity in order to replenish the central tank while beer is being constantly drawn therefrom to the carbonator.

The constant pressure under which the beer is to be delivered to the carbonator may be maintained by an automatic regulating-valve $e^4$ in the by-passage between the suction and delivery connections of pump E, which will open when the pressure exceeds the desired limit and allow the beer to return through the pump, or it may be maintained by causing the pressure in the delivery-pipe of the pump to reduce or increase the flow of beer indirectly through the agency of fluid-pressure operating through means like or similar to those shown and described in connection with pump B to control the action of pump E.

In the carbonator F the beer meets and is charged with air-free carbonic-acid gas obtained as hereinafter explained, and passes from the carbonator through a pipe or hose connection $f'$ into the filter G and thence through the pipe and hose connection $g\ g'$ to the racking-bench H into shipping-kegs I. The pipe or hose connection $f'$ is provided with stop valves $f^2$ and $f^3$ and an intermediate waste or vent valve $f^4$. The delivery-pipe $g$ of the filter is provided with a valved hose connection $g^2$, a waste or vent valve $g^3$, and an intermediate cut-off valve $g^4$.

The gas-supply and connections will now be described.

J J are ordinary fermenting-tubs, open tubs furnished with hoods or bells $j\,j$ being shown in house I and closed tubs in house II. In both hermetically-sealed closures are formed for the collection of gas given off by the fermenting beer contained in the tubs. The closures are severally provided with valve-controlled air-vent and gas-delivery connections $j'\,j'$, by means of which they may be connected and disconnected at will with the gas-main $j^2$, and the air contained in any closure may be completely expelled without admitting it into the gas-main prior to collecting gas for use, as explained in our former application, Serial No. 548,402, filed May 7, 1895.

The gas-main $j^2$ leads to the suction side of a pump K and at intermediate points is connected with an expansible gas-holder L and a safety or pressure-regulating and waste valve M by branches provided with valves $l$ and $m$. The gas-holder L serves as a reservoir for storing surplus gas not needed at the time for carbonating beer, and also serves as a cushion. The branch pipe leading into it passes upwardly through the bottom and terminates at its upper end centrally therein near the top of the outer stationary vessel. The bell is formed with a conical top and provided at its apex with a waste or vent valve $l'$, which is adapted to rest upon the upper end of the gas-pipe when the bell is completely immersed, thus affording an escape for any air contained in the gas-main without admitting it into the gas-holder.

The safety-valve M consists of two parts $m'$ and $m^2$, placed one above the other and connected by a pipe which communicates with the gas-main and is provided with a valve $m^3$, by which gas may be shut off from the upper part $m'$ at will. The upper part, which constitutes the main pressure-regulating and waste valve, consists of an outer closed chamber and an inner chamber opening at the bottom therein. The gas-pipe passes through the bottom of the outer chamber and opens at its upper end into the inner chamber some distance above its lower open end. A gas-waste pipe $m^4$ leads out of the upper part of the outer chamber. A water-supply pipe connects with the gas-pipe $m^4$ and supplies the outer chamber with water. A vertically-adjustable inverted-U-shaped pipe or passage $m^5$ communicates, through one leg and a telescoping connection, with the lower part of the outer chamber of said safety-valve and through the other leg and telescoping pipe connection with the lower part $m^2$ of the safety-valve. This connection serves to regulate the height of the water column in the upper part $m'$ and to supply the lower part $m^2$ with water. The lower part of the safety-valve consists of a chamber open at the top and into which the gas-pipe projects, opening at its lower end near the bottom of said chamber. It has a marginal gutter around the top into which the water overflows and from which it is discharged through a waste pipe or opening. This lower part serves as an auxiliary safety device and is designed to operate when the upper part $m'$ is disconnected for cleaning it or becomes inoperative by reason of the freezing or stoppage of the gas-escape pipe $m^4$, the accumulation of sand or sediment in the bottom of the closed chamber, or other causes.

The water-pipe supplying water to the safety-valve is provided with a by-passage around its connections with the upper part $m'$, so that when it is disconnected for any purpose the water-supply may be cut off therefrom and led directly into the lower part. A water column of less depth is maintained in the upper part $m'$ than in the lower part $m^2$ of the safety-valve, so that under ordinary conditions the surplus gas producing a rise in pressure will displace the water in the upper part and escape through the waste-pipe $m^4$, but in case the upper part fails to operate by reason of the stoppage of any of its connections a slightly greater gas-pressure will cause the surplus gas to escape through the lower part $m^2$, producing a visible and audible agitation of the water, whereby attendants are warned that the upper part is not in working order. A vent or air-escape cock is provided on the top of the upper part $m'$ and communicates with the inner chamber. The delivery-pipe $k$ of the gas-pump leads through branches provided with valves $k'\,k'$ into the purifiers N N. It is provided with stop-valves $k^2$ and $k^3$, a vent-valve $k^4$, and a check-valve $k^5$. Each of the purifiers has a valve-controlled connection with a pipe $n$, leading into a reservoir O, and the outlet of the first purifier is connected with the inlet of the next purifier by a pipe provided with a valve $n'$. By means of these several connections the gas may be conducted through either purifier and shut out from the other or caused to pass through both. From the reservoir O a pipe $o$ leads to a common header P, provided with a number of valves and couplings $p\,p$ for the attachment of the supply-pipe or hose connections $p'$, leading into the carbonators. These pipe or hose connections are each provided with a stop-valve $p^2$ next to the carbonator and an associated air-vent valve $p^3$. The pipe $o$ is provided with a pressure-reducing valve $o'$, a stop-valve $o^2$, and an associated vent-valve $o^3$ close to the header P and a stop-valve $o^4$ and associated vent-valves $o^5$ and $o^6$ near the reservoir O.

Q is a closed vessel provided with a removable cover for the purpose of supplying the purifiers with a chemical solution without admitting air thereto. A water-supply pipe $q$, provided with a valve, leads into the bottom of this vessel, and a pipe $q'$, leading out of the upper part thereof, connects, through valved branches, with the lower parts of the purifiers. This pipe, as well as the cover of the vessel Q and each of the purifiers N, is provided at the highest point therein with an air-vent cock.

It is not only necessary to avoid an overpressure in the gas-collecting system ahead or on the suction side of the gas-pump K, which is accomplished by the safety-valve M, but it is also necessary to prevent the pump from producing a vacuum on its suction side when the production of gas is insufficient to supply the carbonator, as during the later stages of fermentation, and from producing overpressure on its delivery side in the purifiers and storage-reservoir when gas is produced and pumped faster than it is required for the carbonator.

To prevent a vacuum on the suction side in connection with a belt-geared pump which runs continuously, as shown in house I, we provide a diaphragm or expansion-chamber R, which is connected with the suction-pipe $j^2$ and is arranged to operate a three-way or supply and waste valve $r$, controlling the admission of fluid-pressure through a pipe $r'$ to a diaphragm or expansion-chamber $r^2$, which is arranged to open a valve in a by-passage between the suction and delivery pipes of the pump whenever the pressure on the suction side falls below the desired limit. When this occurs, the check-valve $k^5$ will close automatically, preventing the high-pressure gas contained in the purifiers and storage-reservoir from rushing back through the by-passage into the suction-pipe of the pump. Until the normal pressure in the suction-pipe $j^2$ is restored the pump will work idly, requiring only power enough to overcome the friction of its parts. To avoid overpressure on the force side of the pump, we provide a diaphragm or expansion-chamber S, which is connected with any convenient part of the gas-pipe system in which gas is to be held at the higher pressure and is arranged through a system of levers to operate a three-way or supply and waste valve $s$, controlling the admission and release of fluid-pressure through a pipe $s'$ to and from a diaphragm or expansion-chamber $s^2$, arranged to open a by-pass valve between the suction and delivery sides of the pump until the pressure on the delivery side is reduced to normal. The lever connection between the expansion-chamber S and the three-way valve $s$ is compounded, so as to avoid the opening and closing of said valve in rapid succession by slight variations in the gas-pressure to which the diaphragm or expansion-chamber is subjected.

When the pump is steam-geared, as shown in house II, the diaphragm or expansion-chambers R' and S' are arranged through suitable connections to operate valves in the steam-supply pipe of the pump and check or stop the pump whenever the pressure on the suction side falls below the desired limit or the pressure on the delivery side rises above the desired limit. To indicate to the engineer or attendant in charge of the apparatus the condition of the gas-supply, we provide in connection with each gas-holder a number of circuit-controllers $t$, $t'$, and $t^2$ in electric circuits, including at a convenient point different-colored electric lights $t^3$ $t^4$ $t^5$ and a bell $t^6$, or other distinguishable, audible, or visible signals to indicate different positions of the bell of the gas-holder L. When the bell is in its highest position, where its upward movement is arrested by suitable stops, it engages with the circuit-controller $t$, closes the circuit containing the lamp $t^3$, producing a light which indicates that the gas-holder is filled with gas. When the bell descends, this circuit is broken, and at a certain point in its descent it operates the circuit-controller $t'$, closing the circuit including the lamp $t^4$, and produces a light of a different color, which indicates that the contents of the gas-holder are partially exhausted. Upon sinking still farther the bell operates the circuit-closer $t^2$ and closes the circuit including the lamp $t^5$, producing another colored light, which indicates that the contents of the gas-holder are nearly exhausted and that another source of gas must be supplied by connecting fermenting-tubs in which fermentation is at the proper stage to yield gas. In either or all of the circuits containing the colored lights the bell or other audible signal may be included. The lights or signals indicating the lower positions of the gas-holder bell are arranged to continue when once started by the descent of the bell until they are manually discontinued.

Our improved process and the operation of our improved apparatus may be explained in connection with a single system, the extra system or systems being intended mainly to be held in reserve, so that one complete system is always in readiness for use and any reserve part of the apparatus can be put in operation without interruption of the working system with which it is connected.

Storage-beer is drawn by the main beer-pump B from one or more of the vats A through the pipe $a$ and forced through the pipe $b$ to the central tank C. In starting the apparatus and before connecting each and every filled storage-vat A with the pipe $a$ the valve $b'$ is closed and the waste-valve on the top of the lantern $b^2$ is opened, allowing any air contained in the pipe $b$ and its connections with the storage-vat to escape. As soon as the lantern fills with beer and foam and bubbles indicating the presence of air in the beer disappear the valve $b'$ is opened and the vent-cock on the lantern is closed. Air-free beer thus enters and fills the central tank C. In this way the passage of air through and the aeration of the beer contained in the central tank is avoided. The central tank being open relieves the beer previously subjected to the compression of pump B from pressure and allows any air held therein by reason of such compression to escape. From the bottom or lower part of the central tank the beer is drawn through the pipe $c$ and forced by the pump E through pipe $e$ into the carbonator. Before it is admitted to the carbonator all air contained in the pipes between it and the central tank is allowed to escape through the vent-valve $e^3$, the valve $e^2$ being closed. As soon as beer issues from the vent-valve $e^3$ the valve $e^2$ is opened and said vent-valve is closed. The beer now enters the lantern $f$, and any air remaining therein is allowed to escape through the waste-cock on top of said lantern until the lantern is filled with clear foamless beer. The beer-inlet pipe of the carbonator communicates therewith both at the top and bottom and has on opposite sides of its connection with the beer-supply pipe $e$ valves $f^5$ and $f^6$, and above the valve $f^6$ an air-vent or waste-valve $f^7$.

In starting the carbonator the stop-valve $f^5$ and the waste-valve $f^7$ are opened and the valve $f^6$ closed, thus causing beer to enter the carbonator at the bottom. Rising therein it expels the contained air through the vent-valve $f^7$ and a waste-cock on top of the carbonator. As soon as the carbonator and its connections are completely filled with beer and all traces of air are eliminated the waste-valves are closed, the valve $f^6$ is opened, and the valve $f^5$ closed, thereby causing the beer to enter the carbonator at the top, to which air-free carbonic-acid gas is supplied under an automatically-regulated pressure, as hereinafter explained. If by any possibility the central tank should be emptied and air drawn into the pump E and forced by it into the delivery-pipe $e$ and lantern $f$, as soon as the level of the beer contained in said lantern descended sufficiently to permit the float-ball to be seated in the outlet-opening in the bottom communication between the beer-delivery pipe $e$ and carbonator would be cut off and air excluded from the carbonator. In such an event the pressure in the delivery-pipe of the pump would rise above the normal and open the by-pass-valve $e^4$, thereby establishing communication between its delivery and suction sides and preventing a further increase of pressure on the delivery side.

It is intended that the central tank shall always be filled with storage-beer while the apparatus is in operation. It is necessary, however, to occasionally empty the central tank for the purpose of cleansing or repairing it. Whenever the storage-vat A, with which the main beer-pump B is connected, is emptied, air will be drawn by the pump through the pipe $a$ and forced through the pipe $b$ into the lantern $b^2$, in which the beer will descend, allowing the float-ball to be seated in and close the opening in the bottom of the lantern, thereby cutting off communication between said pipe $b$ and the central tank and excluding air from the latter. When this occurs, the pressure in the pipe $b$ will rapidly rise, owing to the continued action of the pump, thereby automatically opening the by-pass valve $b^3$ and establishing communication between the delivery and suction sides of the pump. The valve $b'$ is now closed, another storage-vat is connected, and the air permitted to escape through the vent-cock on top of the lantern until foamless beer fills the lantern, as hereinbefore explained. The vent is then closed, the valve $b'$ opened, and the air-free beer admitted to the central tank. When the beer in the central tank reaches the level desired to be maintained therein, it acts, through the float D, to operate the valve $d$ and release fluid-pressure through pipe $d'$ from the expansion-chamber $d^2$ and thus stop the pump B. When the liquid-level in the central tank falls by reason of the constant withdrawal of beer therefrom, the float descends with it and operates the three-way valve $d$ to admit fluid-pressure through the pipe $d'$ to the expansion-chamber $d^2$ and thereby start the pump.

Having described the method and means of providing a constant supply of air-free beer under automatically-regulated pressure to the carbonator, we will now explain the method and means of obtaining and delivering to the carbonator a constant supply of air-free carbonic-acid gas at the required pressure.

The gas-collecting inclosures of the several fermenting-tubs may be separately freed from air and connected with the gas-main $j^2$, or a number of tubs in which fermentation is at substantially the same stage may be simultaneously freed from air through a common vent and connected with the gas-main or delivery-pipe, and the air may be expelled from the gas-collecting spaces of the fermenting-tubs in various ways, either by gas produced by fermentation in the tubs themselves or obtained from an outside source or by displacing it with a liquid, as by the complete immersion of the hoods or bells of open tubs, as fully explained in our former application hereinbefore mentioned.

We will assume in the present case that fermentation in all the tubs on the upper floor of house I is at the proper stage to yield gas and that the bells $j\,j$ of said tubs are properly adjusted and connected by the hose-sections $j'\,j'$ with the gas-main $j^2$, which is provided with stop-valves $j^3$ and $j^4$ and an air-vent valve $j^5$.

In starting the apparatus various vent-valves connected with the gas system may be opened, so as to permit the gas as it progresses from the fermenting-tubs to more readily displace the air. The bell of the gasometer is completely immersed in water and lowered till the base of the vent-valve $l'$ rests upon and communicates with the upper open end of the gas-pipe which leads into the gasometer. When pure gas issues from this vent-valve, it is closed and surplus air-free gas subsequently produced is allowed to accumulate in the gasometer. The air-vent valve on the top of the safety-valve M is also left open until air-free gas issues therefrom. The gas-pump K being started draws the gas from the pipe $j^2$, forcing it through pipe $k$, purifiers N N, pipe $n$, reservoir O, pipe $o$, header P, and hose connection $p'$ to the carbonator. For the purpose of expelling the air from the purifiers and reservoir at the outset they may be completely filled with water and the water displaced by gas, the air from the pipes leading thereto having been mainly expelled through the various or preceding air-vent cocks, such as $k^4$. Before opening the valve $p^2$ and admitting gas to the carbonator the vent-valve $p^3$ is opened until all traces of air disappear. For the purpose of determining the quality or purity of the gas at this point Bunte's or Winkler's burette is recommended as being simple and reliable.

The water column in the upper part $m'$ of the safety-valve is adjusted by means of the inverted-U-shaped passage $m^5$ to prevent the rise of the gas-pressure above a certain point and to permit the escape of surplus gas when the pressure reaches that point. The bell of the gasometer L is constructed or adjusted to be raised by a lower pressure, so that it will be filled before gas will escape through the safety-valve. When, however, the upward movement of the bell is arrested and gas is produced faster than it is used, pressure rises and the surplus gas, displacing the water column in the upper part of the safety-valve, escapes through the waste-pipe $m^4$. On the other hand, when gas is used faster than it is produced, as during the later stages of fermentation, the diaphragm or expansion device R, connected with the suction side of the pump, will open one of the by-pass valves, establishing communication between the delivery-pipe $k$ and suction-pipe $j^2$ in case the supply of gas in the gasometer L should be at the same time exhausted. In this way substantially constant pressure is maintained in the gas-collecting system from the fermenting-tubs to the gas-pump and both overpressure or vacuum in and injury to the fermenting-tubs and other parts of the apparatus are avoided.

It is desirable to maintain a positive pressure throughout the gas collecting and storage system to avoid the possible ingress of air through leaks and the consequent contamination of the gas. It is not intended to allow the gasometer to become exhausted while the apparatus is in operation, and the automatic device hereinbefore described for preventing the pump from producing a vacuum serves simply as a safeguard in connection with a gasometer in case the electrical indicator connected therewith fails to work, but if the gasometer is disconnected or altogether dispensed with it will be brought into requisition whenever the rate of consumption of gas exceeds the rate of production. The gas is compressed in the purifiers and reservoir O, which serve to store a sufficient quantity in reserve for supplying the carbonator during the interval required for exchanging fermenting-tubs in which fermentation has subsided for those in which it is at the proper stage to yield gas or during the temporary interruption of the pump or any preceding part of the gas-collecting system. From the reservoir O the gas passes through the pipe $o$, containing the valve $o'$ by which its pressure is reduced, to the header P, which is designed to be constantly supplied with air-free gas after the apparatus has once been put in operation. From the header P it is delivered through branch valve-controlled connections $p$ $p$ to any or all of a number of carbonators. The admission of gas to each carbonator is automatically regulated and controlled by a valve, the operation of which is governed by the liquid-level in the carbonator. This may be accomplished by means of mechanism like or similar to that shown in Patent No. 519,140, dated May 1, 1894.

From the carbonator the gas passes with the beer charged therewith through the filter G, thence to the racking-bench. In starting the filter is first filled with water to displace the air contained therein and then the water is displaced by beer. Any air remaining in the filter or its connections is allowed to escape from the vent-valves $f^4$ and $g^3$ or vent-cocks with which the filter and its associated lantern may be furnished. Since during the more active stages of fermentation gas is produced at a more rapid rate than it is required, it is advisable to provide extra storage-reservoirs, which may be connected with the pump when a surplus of gas is produced and filled with gas at a high pressure, say from one hundred and fifty to three hundred pounds, for use in emergencies, such as breaking down of the apparatus or failure in the supply of gas. These extra storage-reservoirs are first filled with water to expel the air and the water is then displaced by gas. When filled, they are cut off from the pump and the gas contained therein held in reserve for such time as it may be needed. To the extent of their capacity the purifiers N N and reservoirs O serve for the storage of gas, and, if necessary or desirable, they may all be temporarily utilized for this purpose.

In practical operation a pressure of about one-half pound per square inch in the gas-collecting system on the suction side of the gas-pump, a pressure of about sixty pounds in the purifiers and reservoir O on the force side of the gas-pump, and a pressure of about forty-five pounds in the pipe $o$ and its connections between the reducing-valve $o'$ and the carbonator may be employed with satisfactory results, although these pressures may be varied within wide limits without affecting the results.

By the various means and methods hereinbefore described of collecting and storing surplus gas produced during the more active stages of fermentation in the ordinary brewing processes a sufficient supply of gas is obtained for continuous carbonation of storage beer without any interruption of or departure from the customary brewing processes or the ordinary operation of the plant for the purpose of providing carbonic-acid gas.

The diaphragm or movable part of the expansion-chamber S is weighted, so as to maintain the desired pressure in the purifiers and storage-reservoir and to cause the by-pass valve to open and close within the desired limits of pressure, which may be varied by increasing or decreasing the weight on either lever. The check-valve $k^5$ in pipe $k$ closes automatically whenever either of the by-pass valves is opened and prevents the high-pressure gas from rushing back through the by-passes into the suction-pipe $j^2$.

While a single system is designed to be of sufficient capacity to finish the entire product of the plant and it is intended under ordinary conditions to operate but one system at a time to provide for cleansing and repairing various parts of the apparatus from time to time without interruption in the operation of carbonating or finishing the beer and to insure one complete system in constant readiness for use, it is necessary to provide duplicates of all essential parts of the apparatus or two complete systems, every essential element of either system being interchangeable with the corresponding element of the other system without interrupting its operation. To this end the beer-delivery pipes $a\ a$ of the storage-vats of the two houses are connected by a cross-pipe A′, having stop-valves $a'\ a'$ close to its connections with said pipes, which are provided on opposite sides thereof with stop-valves $a^2$ and $a^3$. The delivery-pipes $b\ b$ of the main beer-pumps B B′ are connected by a pipe $B^2$, having close to its connections therewith stop-valves $b^4\ b^4$ and associated air-vent valves $b^5\ b^5$, the pipes $b\ b$ being provided on opposite sides thereof with stop-valves $b^6$ and $b^7$. The delivery-pipes $c\ c$ of the central tanks are connected by a pipe C′, having next to its connections therewith stop-valves $c^2\ c^2$ and closely-associated air-vent valves $c^3\ c^3$, the pipes $c\ c$ being provided on opposite sides of the pipe C′ with stop-valves $c^4\ c^5$. The fluid-pressure pipes $d'\ d'$ are connected by a pipe D′, having stop-valves $d^5\ d^5$ next to them, and are provided on opposite sides thereof with stop-valves $d^6\ d^7$. The delivery-pipes $e\ e$ of the central tank-pumps E E are connected by a pipe E′, having next to its connections therewith stop-valves $e^5$ and closely-associated vent-valves $e^6$. The delivery-pipes $f'\ f'$ of the carbonators or the inlet connection of the filters are connected by a pipe F′, having next to its connections therewith stop-valves $f^8$ and closely-associated vent-valves $f^9$. The delivery-pipes $g\ g$ of the filters are connected by a short extension provided with a valve $g^5$. The gas-collecting mains $j^2\ j^2$ are connected by a pipe J′, having next to its connections therewith stop-valves $j^6\ j^6$ and closely-associated vent-valves $j^7\ j^7$. The delivery-pipes $k\ k$ of the gas-pumps K and K′ are connected by pipe $K^2$, having next to its connections therewith stop-valves $k^6\ k^6$ and closely-associated vent-valves $k^7$.

Assuming now that the system of apparatus contained in house I is in operation and that the main beer-pump B breaks down or is stopped for any reason, the corresponding pump B′ of house II may be substituted therefor by opening the valves $a'$ in pipe A′, closing the valve $a^3$ in pipe $a$ of house I, closing the valve $a^2$, and opening the valve $a^3$ in pipe $a$ of house II, thereby connecting the storage-vat A of house I with the suction side of pump B′ in house II. The delivery-pipe of pump B′ is connected with the central tank of house I through the pipe $B^2$ by opening the valves $b^4$ therein, closing the valve $b^6$, and opening the valve $b^7$ in pipe $b$ of house II and opening the valve $b^6$ and closing the valve $b^7$ in pipe $b$ of house I. Before opening the valve $b^4$, however, in house I the associated vent-valve $b^5$ is opened until all the air is expelled from pipe $B^2$ and air-free beer issues therefrom, whereupon said vent-valve is closed and the stop-valve $b^4$ is opened. The stop-valve $b'$, next to the central tank in house I, is also closed and the vent-valve on the lantern $b^2$ opened to allow any remaining air in the pipe connections to escape before beer is admitted to said central tank.

To enable the float D of the central tank in house I to control the operation of the pump B′ in house II, fluid-pressure pipe $d'$ of house I is connected with the corresponding pipe of house II through the cross-pipe D′ by opening the valves $d^5$ therein, closing the valve $d^7$ in house I, and by closing the valve $d^6$ and opening the valve $d^7$ in house II. In like manner the central tank of house II may be substituted for that of house I by connecting the delivery-pipe $b$ of pump B in house I through the cross-pipe $B^2$ with the pipe $b$ in house II, so that said pump will deliver beer into the central tank C of house II. It should be observed that the valve $b^4$ in house II is not to be opened until the air contained in said cross connection is completely expelled through the vent-valve $b^5$.

The proper fluid-pressure connection is made through the pipe D′ to enable the float D of the central tank in house II to control the operation of the pump B in house I. The discharge-pipe $c$ of the central tank in house II is also connected through the cross-pipe C′ with the discharge-pipe $c$ of the central tank in house I by opening the valve $c^2$, closing the valve $c^5$, and opening the valve $c^4$ in house II and closing the valve $c^4$ and opening the valve $c^5$ in house I. Before opening the valve $c^2$ in house I, however, the air contained in the pipe C′ is completely expelled through the associated vent-valve $c^3$. The change is thus effected without admitting air into the system in use and without interrupting its operation.

To exchange the central tank-pump E of house I for the corresponding pump of house II, the suction-pipe of pump E in house II is connected through the pipe C' with the central tank of house I, and its delivery-pipe $e$ is connected through the pipe E' with the carbonator F, next to house I, by opening the valves $e^5$ in pipe E', opening the valve $e'$ in house II, and closing the valve $e'$ in house I, (valve $e^2$ of house II having been previously closed,) but before opening the valve $e^5$ in or next to house I the air contained in the pipe E' and its connections is completely expelled through the associated vent-valve $e^6$.

To exchange the carbonator of house I for the carbonator of house II, the latter is preferably connected and put in operation before the former is cut out, the valve $e^5$ next to house I is opened, allowing beer to enter the pipe E', the vent-valve $e^6$ next to house II is left open, while the associated valve $e^5$ remains closed until the air is expelled from said pipe. The waste-valve is then closed and the valve $e^5$ opened. The valve $e'$ in house II being closed, the valve $e^3$ is left open, while the associated valve $e^2$ remains closed until the air contained in the pipe E' is expelled. The vent $e^3$ is then closed and the valve $e^2$ opened. The valve $f^5$ being open and the valve $f^6$ closed, beer enters the bottom of the carbonator next to house II and fills the same, displacing the air and expelling it through the vent-valve $f^7$, which is left open for the purpose. As soon as the air is completely expelled from the carbonator the vent-valve $f^7$ is closed, the valve $f^6$ is opened, and the valve $f^5$ closed, so as to admit beer into the top of the carbonator, the valve in the connection $f'$ between the carbonator and the filter being closed in the meantime. The valve in the connection $p$ of the header P, with which the carbonator is connected, is now opened, as well as the vent-valve $p^3$, through which the air contained in the pipe or hose connection $p'$ is completely expelled, while the valve $p^2$ remains closed. As soon as air-free gas issues from said vent-valve it is closed and the valve $p^2$ is opened. The valves in the delivery connection $f'$ of the carbonator are now opened, the adjacent valve $f^3$ is closed, and the valve $f^8$ opened, admitting beer to the pipe F'. The air contained in said pipe is expelled at its opposite end through the vent-valve $f^9$, while the associated stop-valve $f^8$ remains closed. When air-free beer issues from this vent-valve, the associated stop-valve is opened, admitting beer from the carbonator next to house II into the filter G next to house I. The carbonator next to house I may now be disconnected without interrupting the operation of the apparatus.

The filters may be similarly interchanged by means of the cross-pipe F' and the extension and connection of their delivery-pipes $g$, provided with the valve $g^5$. If the filter which is to be put in operation has just been supplied with new filtering material, it is completely filled with water to displace the air and the water is in turn displaced by beer and discharged at the racking-bench. As soon as clear beer flows from the racking-faucet it is drawn into shipping-kegs. The racking-benches or faucets can be readily interchanged by attaching the hose connections $g'$ to the proper valves and pipe-couplings $g^2$ of the delivery-pipes $g$ of the filters. It is obvious that this interchange may be effected in various ways, and in place of single elements or apparatus groups comprising any number of like elements may be interchanged with corresponding groups.

For the production of finished beer a constant supply of air-free gas as well as a constant supply of storage beer is required. To this end fermenting-tubs, from which the gas is obtained and in which fermentation has subsided, must be exchanged from time to time for those in which fermentation is in active progress. Suppose for this reason that the fermenting-tubs in house I are to be disconnected and those in house II are to be connected with other parts of the apparatus in house I for the collection of gas. The valves $j^4$, $l$, and $m$ in house II are closed, disconnecting the gas-pump K', the gasometer L, and the safety-valve M. The stop-valve $j^6$ in house II and the vent-valve $j^7$ in house I are opened, admitting gas from the fermenting-tubs in house II to the cross-pipe J'. As soon as air has been completely expelled from the gas-pipes and air-free gas issues from the vent-valve $j^7$ in house I the associated valve $j^6$ is opened, establishing communication between the fermenting-tubs of house II and the gas-pump, gasometer, and safety-valve of house I without admitting air to the main gas-pipe $j^2$ of house I or interrupting the operation of the apparatus. The valve $j^3$ in house I may now be closed to cut off the fermenting-tubs of house I. Suppose now that fermentation has subsided in the fermenting-tubs of house II and is at the proper stage in the fermenting-tubs in house I to yield gas. The vent-valve $j^5$ in house I is opened until the air contained in pipe $j^2$ and its connections above that point is completely expelled and air-free gas issues. The vent is thereupon closed and the associated valve $j^3$ opened. The valve $j^6$ in house I may then be closed, thereby cutting off the fermenting-tubs of house II without interrupting the operation of the apparatus.

The gasometer or safety-valve of either house may be exchanged for that of the other house while the apparatus is in operation without interruption by expelling the air contained in the cross-pipe J' through the proper vent-valve $j^7$, and if the pipe connections between said valve and the gasometer or safety-valve about to be put into use contain air it is expelled through the vent-valve $l'$ on top of the bell of the gasometer or through the vent-valve on top of the upper part of the safety-valve. It is advisable to keep the gasometers supplied with air-free gas, so that they may be brought into service at any time without delay.

In case it is desired to exchange gas-pumps, so that the gas-pump of house II will supply the place of that in house I, the valve $j^6$ in pipe J', next to house I, and the vent-valve $j^7$, next to house II, are opened until air-free gas issues from the latter. The valves $j^3$, $l$, and $m$ of house II are closed and the valve $j^4$ is opened, admitting air-free gas from pipe J' to the pump K' through the pipe $j^2$ of house II. Should the pipe $j^2$, between the valves $j^6$ and $l\ m$, contain air, it can be removed by opening the valve $m$ and the waste-cock on top of the safety-valve M and allowing it to escape from the latter before the valve $j^4$ is opened. The valve $k^3$ of house II is closed and the associated valves $k^2$ and $k^6$ are opened, admitting gas to the cross-pipe $K^2$ and shutting it out from the purifiers and reservoir of house II. The vent-valve $k^7$ at the opposite end of said pipe $K^2$ in house I is left open until the air is completely expelled from said pipe and air-free gas issues therefrom. The associated stop-valve $k^6$ is thereupon opened and the vent-valve closed. The associated valve $k^2$ is now closed, cutting off the gas-pump K and establishing communication between the gas-pump K' of house II and the purifiers N N and reservoir O of house I without interrupting the operation of the apparatus.

The purifiers and gas-reservoir of either house may be substituted for those of the other in a similar manner by the proper manipulation of the stop and vent valves in the cross-pipe $K^2$ and of the stop and vent valves in the gas-delivery pipes $o\ o$, leading from the gas-reservoirs to the header P, from which the carbonators are supplied.

We claim—

1. The process of finishing beer and similar fermented beverages which consists in continuously supplying air-free beer for final carbonation by drawing beer from the storage-vats into the lower part of a tank or vessel in which it is held open to the atmosphere at a level above the inlet and outlet openings of said tank or vessel, whereby air contained therein is permitted to escape, withdrawing the beer from said tank or vessel and delivering it free from air to a carbonator; obtaining air-free carbonic-acid gas from the fermentation of the beer or other liquid and delivering it continuously under regulated pressure to the carbonator, continuously withdrawing the beer or other liquid charged with the gas from the carbonator and filtering it in its passage to shipping or storage kegs or vessels, substantially as and for the purposes set forth.

2. In the process of finishing beer and other carbonated beverages, the method of obtaining a continuous supply of air-free beer or other liquid for carbonation which consists in taking the beer or other liquid from storage vats or vessels in succession or alternation, delivering it into a tank or vessel in which it is held open to the atmosphere at a level constantly above the outlet, thereby permitting air contained in said liquid to escape therefrom and avoiding the admission of air to said outlet, and withdrawing the beer or other liquid at a point below its surface from said tank or vessel, substantially as and for the purposes set forth.

3. In the process of finishing beer and other carbonated beverages, the method of obtaining a constant supply of air-free beer or other liquid for carbonation which consists in drawing the beer or other liquid from storage vats or vessels in succession or alternation into a tank or vessel in which it is held open to the atmosphere at a level above the inlet and outlet openings of said tank, expelling air contained in the connections between said tank and the storage-vats through a vent or waste-opening outside of said tank until foamless beer or liquid issues from said vent before admitting the beer or other liquid into said tank, and finally drawing the beer or other liquid from said tank at a point below the surface of the liquid therein, substantially as and for the purposes set forth.

4. The process of finishing beer and other carbonated beverages which consists in drawing the beer or other liquid from storage vats or vessels in succession or alternation into a tank or vessel, holding it in said tank open to the atmosphere at a level above the outlet of said tank and thus permitting air to escape therefrom and avoiding its admission to the outlet, drawing air-free beer from said tank below the liquid-level therein and delivering it under pressure to a carbonator, as it is required for carbonation, obtaining a constant supply of air-free gas for the carbonation of such beer or liquid from the fermentation of other beer or liquid in the ordinary course of manufacture, by collecting the same in hermetically-sealed inclosures communicating with fermenting-tubs, expelling the air from such inclosures without admitting it into the gas-holder or delivery-main before withdrawing gas therefrom for carbonation, and taking the air-free gas as it is produced by fermentation from one or more such inclosures or groups of inclosures in succession or alternation and delivering it under pressure as it is required to the carbonator, substantially as and for the purposes set forth.

5. In apparatus for finishing beer and other carbonated beverages the combination of two or more complete systems for obtaining air-free gas for carbonation, and for the supply of air-free beer or other liquid to be carbonated, including carbonators, the main parts of each system being interchangeable with the corresponding parts of the other system or systems; and cross connections between corresponding parts of said systems provided with stop-valves and associated vent-valves, whereby any desired part of one system may be substituted for the corresponding part of another system without interruption of the operation of carbonation or admission of air to the system in operation, substantially as and for the purposes set forth.

6. In apparatus for finishing beer and other carbonated beverages, the combination of two or more systems for obtaining a constant supply of beer or other liquid and air-free gas for carbonation, each system comprising storage-vats, a central tank, carbonator, filter, racking-bench, fermenting-tubs, gas-holder, pressure-regulator and gas-pump, and cross connections between corresponding parts of said systems, provided with stop-valves and associated vent-valves, whereby any desired part of one system may be substituted for the corresponding part of another system without interrupting the operation of or admitting air into the latter, substantially as and for the purposes set forth.

7. In apparatus for obtaining air-free gas for finishing beer and other carbonated beverages, the combination of two or more systems each comprising fermenting-tubs provided with closures for inclosing gas-collecting spaces in communication therewith, a gas-main with which said spaces are adapted to be connected and disconnected, a gas-holder and pressure-regulating device having valve-controlled connections with said main, a pump connected with said main, purifiers and a reservoir connected with said pump, and pipe connections between the delivery-pipes of the fermenting-tubs, pumps, and reservoirs of the several systems and having close to their union therewith stop-valves and associated vent-valves whereby the fermenting-tubs, gas-holder, safety-valve, pump or purifiers and reservoir of either system may be substituted for corresponding parts of another system without interrupting the operation of the latter or admitting air thereto, substantially as and for the purposes set forth.

8. In apparatus for providing a constant supply of air-free beer or other liquid for carbonation, the combination of two or more systems, each comprising storage-vats, a central tank having a supply-pipe by which the lower part thereof may be connected at will with the several storage-vats, said supply-pipe being provided close to said tank with a stop-valve and an associated vent-valve, means of automatically regulating the supply of beer or other liquid to said tank according to the level of the liquid therein, a delivery-pipe leading out of the lower part of said central tank, and cross-pipes connecting the supply and delivery pipes of the central tanks of the several systems and having close to their unions therewith, stop-valves and associated vent-valves, whereby the storage-vats or the central tank of either system may be substituted for corresponding parts of another system without admitting air to or interrupting the operation of the latter, substantially as and for the purposes set forth.

9. In apparatus for affording a constant supply of air-free beer or other liquids for carbonation, the combination of two or more systems, each comprising storage-vats, a pump having valve-controlled connections therewith, a central tank connected with the delivery-pipe of said pump, and a pump connected by its suction-pipe with said central tank below the level of the liquid to be maintained therein, a fluid-pressure-pump regulator adapted to be controlled in operation by the liquid-level in the central tank for governing the pump which supplies liquid thereto, pipe connections between the suction and delivery pipes of said pumps provided with valves, and a valve-controlled pipe connection between the fluid-pressure-pump regulators of the several systems, whereby the storage-vats, central tank, or either pump of either system may be substituted for the corresponding parts of another system without interrupting the operation of the latter, substantially as and for the purposes set forth.

10. In apparatus for providing a constant supply of air-free gas for finishing beer and other carbonated beverages, the combination of fermenting-tubs provided with closures and adapted to collect gas produced by fermentation in said tubs, a gas-main adapted to be connected therewith, and a pressure-regulating device consisting of a chamber comprising two compartments, with a gas-inlet connection opening into one compartment and a waste connection opening from the other compartment, and means of maintaining a water column between said inlet and outlet openings and of adjusting the height of said water column, substantially as and for the purposes set forth.

11. In apparatus for providing a constant supply of air-free gas for finishing beer and other carbonated beverages, the combination of fermenting-tubs provided with closures adapted to collect gas produced by fermentation in said tubs, a gas-main adapted to be connected therewith, and a pressure-regulating device consisting of two chambers located one above the other, the upper chamber having two compartments with a gas-inlet connection with said main opening into one compartment and an outlet connection opening out of the other compartment, the lower chamber being open at the top and having a gas-inlet connection communicating with said main and with the inlet connection of the upper chamber and opening into the lower part of said lower chamber, a water-supply connection with the upper chamber and an outlet connection leading therefrom into the lower chamber and provided with a vertically-adjustable section whereby the height of the water column in the upper chamber may be adjusted to regulate the pressure in said gas-main and fermenting-tubs, substantially as and for the purposes set forth.

12. In apparatus for providing a constant supply of air-free gas for finishing beer and other carbonated beverages, the combination of fermenting-tubs, provided with closures adapted to collect gas produced by fermentation in said tubs, a pump connected on the suction side with said gas-main, and an automatic device adapted to prevent said pump from reducing pressure in said gas-main below a certain point, substantially as and for the purposes set forth.

13. In apparatus for providing a constant supply of air-free gas for finishing beer and other carbonated beverages, the combination of fermenting-tubs provided with closures for collecting gas generated therein, a gas-main adapted to be connected with said closures, a gasometer comprising an outer stationary vessel and a movable hood or bell adapted to be completely immersed therein and provided at the highest point with a vent-cock, and a gas inlet and outlet pipe passing upwardly into the bell of the gasometer and opening at its upper end directly below said vent-cock, which, when the bell is in its lowest position is adapted to register with and serve as a vent for said pipe, substantially as and for the purposes set forth.

In testimony that we claim the foregoing as our own we affix our signatures in presence of two witnesses.

JACOB F. THEURER.
PAUL FISCHER.

Witnesses:
ALFRED SCHEDLEY,
CHAS. L. GOSS.